United States Patent
Kojima et al.

(10) Patent No.: US 7,365,122 B2
(45) Date of Patent: Apr. 29, 2008

(54) FLUOROELASTOMER COMPOSITION

(75) Inventors: Yoshifumi Kojima, Fujisawa (JP); Atsushi Koga, Fujisawa (JP); Kenichi Fujimoto, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 11/634,556

(22) Filed: Dec. 6, 2006

(65) Prior Publication Data

US 2007/0083000 A1    Apr. 12, 2007

Related U.S. Application Data

(62) Division of application No. 10/752,870, filed on Jan. 7, 2004, now Pat. No. 7,202,299.

(30) Foreign Application Priority Data

Feb. 19, 2003   (JP)   ............................. 2003-040947

(51) Int. Cl.
   *C08G 18/42*   (2006.01)
(52) U.S. Cl. ...................... 524/500; 524/544; 524/545; 526/247; 526/255
(58) Field of Classification Search ................ 524/500, 524/544, 545; 526/255, 247
   See application file for complete search history.

(56) References Cited

U.S. PATENT DOCUMENTS 3,573,976 A * 4/1971 Duane et al. ............... 427/118
6,864,336 B2 * 3/2005 Kaspar et al. .............. 526/255
2004/0037967 A1 * 2/2004 Feiring et al. .............. 427/409
2004/0048983 A1 * 3/2004 Hochgesang et al. ....... 525/132

FOREIGN PATENT DOCUMENTS

| JP | 4-229481 | 8/1992 |
| JP | 9-159027 | 6/1997 |
| JP | 2001-72856 | 3/2001 |

* cited by examiner

*Primary Examiner*—Peter D. Mulcahy
*Assistant Examiner*—Henry S. Hu
(74) *Attorney, Agent, or Firm*—Butzel Long

(57) ABSTRACT

A fluoroelastomer composition, which comprises 100 parts by weight of vinylidene fluoride-perfluoro(methyl vinyl ether)-tetrafluoroethylene terpolymer or vinylidene fluoride-hexafluoropropene copolymer, and 10-50 parts by weight of liquid fluoroelastomer having a viscosity of 500 to 3,000 cps at 100° C., can be made cross-linkable or vulcanizable fluoroelastomer composition upon further addition of 0.5 to 5 parts by weight of an organic peroxide and 0.5 to 10 parts by weight of a polyfunctional unsaturated compound or further addition of 0.5 to 10 parts by weight of a polyol-based vulcanizing agent thereto. The fluoroelastomer composition can give a cross-linked or vulcanized product having a hardness (Durometer A) of not more than 50 and distinguished processability and compression set resistance characteristics.

9 Claims, No Drawings

FLUOROELASTOMER COMPOSITION

RELATED APPLICATION

This application is a divisional application of U.S. patent application Ser. No. 10/752,870, filed Jan. 7, 2004, now U.S. Pat. No. 7,202,299 to which priority is claimed under 35 U.S.C. §120 and to which priority is claimed under 35 U.S.C. §119 to JP 2003-040947, filed Feb. 19, 2003.

BACKGROUND OF THE INVENTION

1) Field of the Invention

The present invention relates to a fluoroelastomer composition, and more particularly to a fluoroelastomer composition suitable for use as a molding material of low-hardness sealing members.

2) Related Art

Generally, fluoroelastomer is widely used as materials with distinguished heat resistance and chemical resistance, but a lower limit value of hardness (Durometer A) of cross-linked products thereof is about 60. To adjust the hardness of elastomer materials in the ordinary use, a balance is kept mainly between the amount of carbon black as a reinforcing agent and the amount of a plasticizer. To lower the hardness, a larger amount of paraffinic plasticizer, ester-type plasticizer, or the like is usually added thereto, but plasticizers with a good compatibility with the fluoroelastomer are not so much available. In many cases, the fluoroelastomer is used basically in high-temperature circumstances, and when exposed to such circumstances for a long time most of the plasticizer is evaporated off, resulting in failure to attain the desired object. Injection molding of fluoroelastomer to prepare fine products in a larger flow length suffers from such a problem as occurrence of short shots, resulting in failure of product molding.

SUMMARY OF THE INVENTION

An object of the present invention is to provide a fluoroelastomer composition capable of producing cross-linked or vulcanized products with a hardness (Durometer A) of not more than 50 and distinguished processability and compression set resistance characteristics.

The object of the present invention can be attained by a fluoroelastomer composition, which comprises 100 parts by weight of vinylidene fluoride-perfluoro(methyl vinyl ether)-tetrafluoroethylene terpolymer or vinylidene fluoride-hexafluoropropene copolymer and 10 to 50 parts by weight of liquid fluoroelastomer having a viscosity of 500 to 3,000 cps at 100° C. Upon further addition of 0.5 to 5 parts by weight of an organic peroxide and 0.5 to 10 parts by weight of a polyfunctional unsaturated compound or further addition of 0.5 to 10 parts by weight of a polyol-based vulcanizing agent to the fluoroelastomer composition, the fluoroelastomer composition can be cross-linkable or vulcanizable.

DETAILED DESCRIPTION OF THE INVENTION

Vinylidene fluoride [VdF]-perfluoro(methyl vinyl ether) [FMVE]-tetrafluoroethylene [TFE] terpolymer or vinylidene fluoride [VdF]-hexa-fluoropropene [HFP] copolymer can be prepared from VdF, FMVE and TFE or from VdF and HFP by a well known conventional method through solution polymerization, suspension polymerization or emulsion polymerization, and can be further copolymerized with other fluoroolefins such as hexafluoropropene (in case of the VdF-FMVE-TFE terpolymer), chlorotri-fluoroethylene, vinyl fluoride, etc. or with such olefins as propylene, etc.

When the copolymerization reaction is carried out in the presence of an iodobromo-containing compound, an iodo-containing compound or a bromo-containing compound, at least one of iodine groups and bromine groups are introduced into the fluoroolefin terpolymer or copolymer to form cross-linking sites for the organic peroxide cross-linking.

The iodobromo-containing compound includes saturated or unsaturated, aliphatic or aromatic compounds represented by the following general formula:

where R is a fluorohydrocarbon group, a chlorofluorohydrocarbon group, a chlorohydrocarbon group or a hydrocarbon group, and n and m each are 1 or 2, preferably n and m each are 1. The aliphatic iodobromo-containing compound includes, for example, 1-bromo-2-iodoperfluoroethane, 1-bromo-3-iodoper-fluoropropane, 1-bromo-4-iodoperfluorobutane, 2-bromo-3-iodoperfluoro-butane, 3,4-dibromo-1-iodo-1,1,2,2,4,4-hexafluorobutane, 3-bromo-4-iodo-perfluorobutene-1, 2-bromo-4-iodoperfluorobutene-1, etc. The aromatic iodobromo-containing compound includes, for example, monoiodomonobromo-substituted benzene at various substituent positions, diiodomonobromo-substituted benzene at various substituent positions, monoiododibromo-substituted benzene at various substituent positions, (2-iodoethyl)- and (2-bromoethyl)-substituted benzenes at various substituent positions, etc. These iodobromo-containing compounds generally bond to molecule terminals to give effectively cross-linkable fluoroelastomers, and to this effect the iodobromo-containing compound must be bonded to the fluoroelastomer so that about 0.01 to about 5% by weight, preferably about 0.05 to about 3% by weight, each of iodine and bromine can be bonded to the molecule terminal of fluoroelastomer.

The iodo-containing compound includes, for example, iodo-containing monomer compounds such as iodotrifluoroethylene, 1,1-difluoro-2-iodoethylene, perfluoro(2-iodoethyl vinyl ether), vinyl iodide, etc. The bromo-containing compound includes, for example, bromo-containing monomer compounds such as various brominated vinyl compounds or olefins, bromo-containing perfluoroalkyl perfluorovinyl ether, etc. About 0.01 to about 2% by mole, preferably about 0.03 to about 1% by mole of the iodo-containing compound or the bromo-containing compound is used on the basis of sum total of VdF, FMVE and TFE or sum total of VdF and HFP.

VdF-FMVE-TFE terpolymer having a copolymerization molar ratio of 55 to 80% VdF, 1 to 25% FMVE and 10 to 30% TFE, sum total being 100%, can be used. Practically, such commercially available products as Viton GFLT, Viton GLT 505, Viton GLT 305 (all of which are products made by DuPont), etc. can be used directly as such. VdF-HFP copolymer having a copoly-merization molar ratio of 80 to 75% VdF and 20 to 25% HFP, sum total being 100%, can be used. Practically, such commercially available products as E60C (a product made by DuPont), Daiel G801 (a product made by Daikin Industries, Ltd.), Dainion FC3009 (a product made by Sumitomo-3M Co.), Florel FC-3009 (a product by 3M Corp.), etc. can be used directly as such.

Liquid fluoroelastomer to be added to the VdF-FMVE-TFE terpolymer or the VdF-HFP copolymer includes, for example, vinylidene fluoride-hexafluoropropene copolymer, vinylidene fluoride-hexafluoropropene-tetra-fluoroethylene terpolymer, perfluoropropene oxide polymer, etc., and about 10 to about 50 parts by weight, preferably about 10 to about 30 parts by weight, of liquid fluoroelastomer having a viscosity of about 500 to about 3,000 cps, preferably about 550 to about 2,000 cps, at 100° C. can be used on the basis of 100 parts by weight of the VdF-FMVE-TFE terpolymer or the VdF-HFP copolymer.

Liquid fluoroelastomer having a viscosity of less than about 500 cps, which has characteristics like those of fluoro-oil, is used, resulting in difficult kneading and easy extraction of the fluoro-oil from cross-linked or vulcanized products, whereas liquid fluoroelastomer having a viscosity of more than about 3,000 cps makes the flowability of the resulting composition lower and the moldability thereof worse. Furthermore, when the mixing proportion of the liquid fluoroelastomer is less than about 10 parts by weight, not only the hardness (Durometer A) of the cross-linked or vulcanized product will be more than 50, but also the elongation, low-temperature characteristics and compression set characteristics thereof will be lowered, whereas when the mixing proportion is above about 50 parts by weight, kneading itself will be difficult to conduct.

Actually, commercially available liquid fluoroelastomers such as Viton LM (a product made by DuPont), G101 (a product made by Daikin Industries, Ltd.) can be used directly as such.

A cross-linkable fluoroelastomer composition can be prepared by adding about 0.5 to about 10 parts by weight, preferably about 1 to about 5 parts by weight, of an organic peroxide to the fluoroelastomer composition comprising VdF-FMVE-TFE terpolymer or VdF-HFP copolymer and the liquid fluoroelastomer, on the basis of 100 parts by weight of the terpolymer or the copolymer.

Organic peroxide for use in the present invention includes, for example, t-butyl peroxide, dicumyl peroxide, t-butyl cumyl peroxide, 1,1-di(t-butylperoxy)-3,3,5-trimethylcyclohexane, 2,5-dimethyl-2,5-di(t-butylperoxy)hexane, 2,5-dimethyl-2,5-di(t-butylperoxy)hexine-3, 1,3-di(t-butylperoxy-isopropyl)benzene, 2,5-dimethyl-2,5-di(benzoylperoxy)hexane, t-butyl-peroxybenzoate, t-butylperoxy-isopropylcarbonate, n-butyl-4,4-di(t-butyl-peroxy)valerate, etc.

When the organic peroxide cross-linking agent is used, it is preferable to use a polyfunctional unsaturated compound as a cross-linking aid, and about 0.5 to about 10 parts by weight, preferably about 1 to about 8 parts by weight, of a polyfunctional unsaturated compound is used on the basis of 100 parts by weight of the terpolymer or the copolymer. The polyfunctional unsaturated compound for use in the present invention includes, for example, triallyl isocyanurate, triallyl cyanurate, trimethyl allyl isocyanurate, ethylene glycol dimethacrylate, trimethylolpropane trimethacrylate, etc.

When a mixing proportion each of the organic peroxide and the polyfunctional unsaturated compound is less than about 0.5 parts by weight, no satisfactory cross-linking density will be obtained, whereas, when the mixing proportion each thereof is more than about 10 parts by weight, no vulcanization moldings will be obtained due to foaming, or, if obtained, only those with a lower modulus of rubber elasticity or a lower elongation will be obtained.

The VdF-HFP polymer can be vulcanized also by a polyol-based vulcanizing agent besides the organic peroxide cross-linking agent, where about 0.5 to about 10 parts by weight, preferably about 1 to about 5 parts by weight, of a polyol-based cross-linking agent is used on the basis of 100 parts by weight of the VdF-HFP copolymer. The polyol-based vulcanizing agent includes, for example, polyhydroxy aromatic compounds such as 2,2-bis(4-hydroxyphenyl)propane [bisphenol A], 2,2-bis(4-hydroxyphenyl)per-fluoropropane [bisphenol AF], hydroquinone, catechol, resorcinol, 4,4'-dihydroxydiphenyl, 4,4'-dihydroxydiphenylmethane, 4,4'-dihydroxy-diphenylsulfone, 2,2-bis(4-hydroxyphenyl) butane, etc., and their alkali metal salts and alkaline earth metal salts. In that case, it is effective to use a monophenolic compound, an acid acceptor and a quaternary onium salt compound together with the polyol-based (bisphenol-based) vulcanizing agent (JP-A-2000-198882).

The present fluoroelastomer composition can further contain, besides the above-mentioned essential components, a reinforcing agent, typically carbon black; a filler such as talc, clay, graphite, calcium silicate, etc., a processing aid such as stearic acid, palmitic acid, paraffin wax, etc.; an acid acceptor such as zinc oxide, magnesium oxide, etc.; various compounding components generally used in the rubber industry such as an antioxidant, a plasticizer, etc., appropriately when required. Furthermore, various additives such as a stabilizer, a tackifier, a mold release agent, a pigment, a flame retarder, a lubricant, etc. can be added thereto. To improve the wear resistance, moldability, etc., a small amount of thermoplastic resin powder or thermosetting resin powder can be also added thereto. To improve the strength and rigidity, short fibers, etc. can be also added thereto.

The fluoroelastomer composition can be prepared by kneading through a kneading machine such as an Intermixer, a kneader, a Banbury mixer, etc., or open rolls, etc., and molding (cross-linking or vulcanization) can be carried out generally by heating at about 150° to about 200° C. for about 3 to about 60 minutes through an injection molding machine, a compression molding machine, a vulcanization press, etc., followed, when required, by secondary cross-linking (secondary vulcanization) at about 150° to about 250° C. for about 1 to about 24 hours.

The present fluoroelastomer composition can give a cross-linked or vulcanized product having a hardness (Durometer A) of 20 to 50 and a compression set of not more than 50%, preferably not more than 15%, and a low-temperature characteristic of not more than −25° C. in terms of TR10 value particularly when the VdF-FMVE-TFE terpolymer is used, and thus can be used as effective molding materials for various mechanical parts, for example, sealing members with a low bending backward force, particularly sealing members requiring a low-temperature characteristic, upon molding into desired shapes while retaining a good processability. Furthermore, the present fluoroelastomer composition can be used as effective molding materials for fuel cell stack gaskets requiring a low bending backward force and a sufficient compatibility with working circumstances from a low temperature condition to a higher one, and also as effective molding materials for HDD (hard disc driving) gaskets.

PREFERRED EMBODIMENTS OF THE INVENTION

The present invention will be described in detail below, referring to Examples and Comparative Examples.

EXAMPLE 1

| | Parts by weight |
|---|---|
| VdF-FMVE-TFE terpolymer (Viton GFLT) | 100 |
| Liquid fluoroelastomer (Viton LM; viscosity 2,000 cps) | 25 |
| MT carbon black | 1 |
| Calcium hydroxide | 1.5 |
| Magnesium oxide | 1.5 |
| Aliphatic wax (VPA No. 3, a product made by DuPont) | 1 |
| 2,5-dimethyl-2,5-di-t-butyl peroxyhexane (Perhexa 25B-40, 40%, a product made by NOF Corp.) | 2 |
| Triallyl isocyanurate (Tyke M-60, 60%, a product made by Nihon Kasei, Co.) | 2 |

All the foregoing components except the organic peroxide were kneaded by a 3 L kneader and then admixed with the organic peroxide to make a rubber sheet. The rubber sheet was then subjected to press molding (primary cross-linking) at 170° C. for 10 minutes and then to oven cross-linking (secondary cross-linking) at 200° C. for 24 hours to mold a slab sheet(150 mm×150 mm×2 mm). Separately, a test piece for compression set test (a disc, 29.0 mm in diameter and 12.5 mm in thickness) was molded.

Evaluation of molding processabilities and measurement of material physical properties of moldings were conducted according to the following standards:

<Molding Processabilities>

Kneadability: evaluated as ○ for easy kneading and as x for difficult kneading due to stickiness and adhesion Moldability: evaluated as ○ for absence of such inconvenience as foaming, etc. and as x for presence of the inconvenience Mold releasability: evaluated as ○ for easy mold release and as x for difficult mold release <Material Physical Properties>

Hardness: Durometer A, according to JIS K-6253 corresponding to ASTM D2240 Durometer Type A Tensile strength: Dumbell No. 3 form, according to JIS K-6251

Elongation: Dumbell No. 3 form, according to JIS K-6251

Low-temperature characteristic: TR test, according to JIS K-6261

Compression set: 150° C. for 70 hours, according to JIS K-6262 corresponding to ASTM D395 Test Method B

EXAMPLE 2

In Example 1, the amount of liquid fluoroelastomer was changed to 10 parts by weight.

EXAMPLE 3

In Example 1, the amount of liquid fluoroelastomer was changed to 50 parts by weight.

EXAMPLE 4

In Example 1, the same amount of Viton GLT 505 was used in place of Viton GFLT as a VdF-FMVE-TFE terpolymer.

EXAMPLE 5

In Example 1, the same amount of Daikin G101 (viscosity 1,200 cps) was used in place of Viton LM as a liquid fluoroelastomer.

EXAMPLE 6

In Example 1, the same amount of dicumyl peroxide (Percumyl D, a product made by JOF Corp.) was used in place of Perhexa 25B-40 as an organic peroxide.

EXAMPLE 7

In Example 1, the amount of the organic peroxide was changed to 4 parts by weight and the amount of the triallyl isocyanurate was changed to 4 parts by weight.

COMPARATIVE EXAMPLE 1

In Example 1, no liquid fluoroelastomer was used.

COMPARATIVE EXAMPLE 2

In Example 1, the amount of the liquid fluoroelastomer was changed to 5 parts by weight.

COMPARATIVE EXAMPLE 3

In Example 1, the amount of the liquid fluoroelastomer was changed to 55 parts by weight.

COMPARATIVE EXAMPLE 4

In Example 1, the amount of the organic peroxide was changed to 7 parts by weight and the amount of the triallyl isocyanurate was changed to 14 parts by weight, respectively.

COMPARATIVE EXAMPLE 5

In Example 1, the amount of the organic peroxide was changed to 0.1 parts by weight and the amount of the triallyl isocyanurate was changed to 0.2 parts by weight, respectively.

Results of evaluation and measurement in the foregoing Examples 1 to 7 and Comparative Examples 1 and 2 are shown in the following Table 1. In Comparative Example 3 no kneading could be carried out, and in Comparative Examples 4 and 5 kneadability was good, but no molding could be carried out.

TABLE 1

| Evaluation and Measurement | Example No. | | | | | | | Comp. Ex. No. | |
|---|---|---|---|---|---|---|---|---|---|
| | 1 | 2 | 3 | 4 | 5 | 6 | 7 | 1 | 2 |
| [Molding processabilities] | | | | | | | | | |
| Kneadability | ○ | ○ | ○ | ○ | ○ | ○ | ○ | ○ | ○ |
| Moldability | ○ | ○ | ○ | ○ | ○ | ○ | ○ | ○ | ○ |
| Mold releasability | ○ | ○ | ○ | ○ | ○ | ○ | ○ | ○ | ○ |
| [Material physical properties] | | | | | | | | | |
| Hardness (Durometer A) | 38 | 49 | 31 | 35 | 36 | 36 | 40 | 55 | 52 |
| Tensile strength (MPa) | 7.2 | 8.5 | 5.6 | 6.7 | 7.1 | 6.8 | 7.1 | 8.5 | 6.8 |
| Elongation (%) | 720 | 560 | 850 | 700 | 670 | 680 | 600 | 280 | 300 |
| Low-temperature characteristics TR10 (° C.) | −30 | −28 | −32 | −30 | −30 | −30 | −30 | −25 | −26 |
| Compression set (%) | 8 | 10 | 9 | 8 | 8 | 9 | 11 | 13 | 12 |

EXAMPLE 8

| | Parts by weight |
|---|---|
| VdF-HFP copolymer (Daiel G801, a product made by Daikin Industries, Ltd.) | 100 |
| Liquid fluoroelastomer (Viton LM, viscosity 2,000 cps) | 25 |
| MT carbon black | 1 |
| Calcium hydroxide | 1.5 |
| Aliphatic wax (VPA No. 3) | 1 |
| 2,5-dimethyl-2,5-di-t-butylperoxyhexane (Perhexane 25B-40, 40%) | 2 |
| Triallyl isocyanurate (Tyke M-60, 60%) | 2 |

All the foregoing components except the organic peroxide were kneaded by a 3 L kneader, and then admixed with the organic peroxide to make a rubber sheet. Then, the rubber sheet was subjected to press molding (primary cross-linking) at 170° C. for 10 minutes and then to oven cross-linking (secondary cross-linking) at 200° C. for 24 hours to mold a slab sheet(150 mm×150 mm×2 mm). Separately, a test piece for compression set test (a disc, 29.0 mm in diameter and 12.5 mm in thickness) was molded.

Evaluation of molding processabilities and measurement of material physical properties were conducted in the same manner as in Example 1.

EXAMPLE 9

In Example 8, the amount of the liquid fluoroelastomer was changed to 10 parts by weight.

EXAMPLE 10

In Example 8, the amount of the liquid fluoroelastomer was changed to 50 parts by weight.

EXAMPLE 11

In Example 8, the same amount of Daikin G101 (viscosity 1,200 cps) was used in place of Viton LM as a liquid fluoroelastomer.

EXAMPLE 12

In Example 8, the same amount of dicumyl peroxide (Percumyl D) was used in place of Perhexa 25B-40 as an organic peroxide.

EXAMPLE 13

In Example 8, the amount of the organic peroxide was changed to 4 parts by weight and the amount of the triallyl isocyanurate was changed to 4 parts by weight, respectively.

EXAMPLE 14

| | Parts by weight |
|---|---|
| VdF-HFP copolymer (Florel FC-3009, a product made by 3M, containing a polyol-based vulcanizing agent) | 100 |
| Liquid fluoroelastomer (Viton LM) | 25 |
| MT carbon black | 1 |
| Magnesium oxide | 3 |
| Aliphatic wax (VPA No. 3) | 1 |

All the foregoing components were kneaded by a 3 L kneader to make a rubber sheet. Then, the rubber sheet was subjected to press molding (primary vulcanization) at 170° C. for 10 minutes and then to oven vulcanization (secondary vulcanization) at 200° C. for 24 hours to mold a slab sheet(150 mm×150 mm×2 mm). Separately, a test piece for compression set (a disc, 29.0 mm in diameter and 12.5 mm in thickness) was molded. Evaluation of molding processabilities and measurement of material physical properties of moldings were conducted in the same manner as in Example 1.

COMPARATIVE EXAMPLE 6

In Example 8, no liquid fluoroelastomer were used.

COMPARATIVE EXAMPLE 7

In Example 8, the amount of the liquid fluoroelastomer was changed to 5 parts by weight.

COMPARATIVE EXAMPLE 8

In Example 8, the amount of the liquid fluoroelastomer was changed to 55 parts by weight.

COMPARATIVE EXAMPLE 9

In Example 8, the amount of the organic peroxide was changed to 7 parts by weight and the amount of the triallyl isocyanurate was changed to 14 parts by weight, respectively.

COMPARATIVE EXAMPLE 10

In Example 8, the amount of the organic peroxide was changed to 0.1 parts by weight and the amount of the triallyl isocyanurate was changed to 0.2 parts by weight, respectively.

Results of evaluation and measurement in the foregoing Examples 8 to 14 and Comparative Examples 6 and 7 are shown in the following Table 2. In Comparative Example 8 no kneading could be carried out, and in Comparative Examples 9 and 10 the kneadability was good, but no molding could be carried out.

TABLE 2

| Evaluation and Measurement | Example No. | | | | | | | Comp. Ex. No | |
|---|---|---|---|---|---|---|---|---|---|
| | 8 | 9 | 10 | 11 | 12 | 13 | 14 | 6 | 7 |
| [Molding processabilities] | | | | | | | | | |
| Kneadability | ◯ | ◯ | ◯ | ◯ | ◯ | ◯ | ◯ | ◯ | ◯ |
| Moldability | ◯ | ◯ | ◯ | ◯ | ◯ | ◯ | ◯ | ◯ | ◯ |
| Mold releasability | ◯ | ◯ | ◯ | ◯ | ◯ | ◯ | ◯ | ◯ | ◯ |
| [Material physical properties] | | | | | | | | | |
| Hardness (Durometer A) | 37 | 48 | 30 | 37 | 37 | 39 | 36 | 55 | 52 |
| Tensile strength (MPa) | 4.2 | 5.1 | 3.4 | 4.4 | 4.3 | 5.3 | 4.3 | 8.5 | 6.8 |
| Elongation (%) | 640 | 400 | 750 | 630 | 620 | 600 | 680 | 270 | 300 |
| Low-temperature characteristics TR10 (° C.) | −15 | −16 | −15 | −16 | −16 | −16 | −16 | −16 | −16 |
| Compression set (%) | 8 | 9 | 8 | 9 | 9 | 10 | 7 | 12 | 12 |

The invention claimed is:

1. A fluoroelastomer, composition for use as a molding material for fuel cell stack gaskets or hard disc driving gaskets which comprises 100 parts by weight of vinylidene fluoride-hexafluoropropene copolymer, 10 to 50 parts by weight of liquid fluoroelastomer having a viscosity of 500 to 3,000 cps at 100° C., 0.5 to 5 parts by weight of an organic peroxide, and 0.5 to 10 parts by weight of a polyfunctional unsaturated compound.

2. A fluoroelastomer composition according to claim 1, wherein the copolymer is a vinylidene fluoride-hexafluoropropene copolymer with one of iodine group and/or bromine group as introduced into the copolymer.

3. A fluoroelastomer composition according to claim 1, wherein 0.5 to 10 parts by weight of a polyol-based vulcanizing agent is further contained.

4. A fluoroelastomer composition according to claim 1, wherein a cross-linked product of the composition has a hardness of 20 to 50 in terms of Durometer A according to JIS K-6253 corresponding to ASTM D2240 Durometer Type A.

5. A fluoroelastomer composition according to claim 3, wherein a cross-linked product of the composition has a hardness of 20 to 50 in terms of Durometer A according to JIS K-6253 corresponding to ASTM D2240 Durometer Type A.

6. A fluoroelastomer composition according to claim 1, wherein a cross-linked product of the composition has a compression set of not more than 50% according to JIS K-6262 corresponding to ASTM D395 Test Method B.

7. A fluoroelastomer composition according to claim 3, wherein a cross-linked of the composition has a compression set of not more than 50% according to JIS K-6262 corresponding to ASTM D395 Test Method B.

8. A fluoroelastomer composition according to claim 7 for use as a molding material for sealing members requiring a low-temperature characteristic of not more than −25° C. in terms of TR10 value.

9. A fluoroelastomer composition according to claim 7 for use as a molding material for sealing members requiring a low-temperature characteristic of not more than −25° C. in terms of TR10 value.

* * * * *